United States Patent [19]

Greenwood

[11] 4,320,076
[45] Mar. 16, 1982

[54] EXPANDABLE SEALING COMPOSITIONS

[75] Inventor: Terence L. Greenwood, Geneva, Switzerland

[73] Assignee: Standard Oil Company (Indiana), Chicago, Ill.

[21] Appl. No.: 252,270

[22] Filed: Apr. 8, 1981

Related U.S. Application Data

[63] Continuation of Ser. No. 917,879, Jun. 22, 1978, abandoned.

[51] Int. Cl.³ .......................... E04B 1/16; C08J 9/00
[52] U.S. Cl. ....................................... 264/35; 52/743; 156/71; 156/79; 264/36; 264/46.5; 521/54; 521/59
[58] Field of Search ................ 156/71, 79; 264/35, 264/36, 46.5; 52/743; 521/54

[56] References Cited

U.S. PATENT DOCUMENTS 3,515,569  6/1970  Walters et al. ................ 521/54
3,855,378 12/1974  Topicik ........................... 521/59
3,864,181  2/1975  Wolinski et al. ............... 521/54

OTHER PUBLICATIONS

Whitby et al., "Synthetic Rubber", John Wiley and Sons, New York, 1954, pp. 845, 846 and 879.
Encyclopedia of Polymer Science & Technology, vol. 2, John Wiley & Sons, N.Y., 1965, pp. 770 and 785-793.

Primary Examiner—Morton Foelak
Attorney, Agent, or Firm—William H. Magidson; William T. McClain

[57] ABSTRACT

A composition comprising a butyl rubber and from about 5 to 25 percent by volume of expandable resinous microspheres containing a volatile blowing agent inside said resinous microspheres.

5 Claims, No Drawings

EXPANDABLE SEALING COMPOSITIONS

This is a continuation of application Ser. No. 917,879, filed June 22, 1978, now abandoned.

This invention relates to expandable sealing compositions comprising an expandable resinous polymer having incorporated therein a volatile blowing agent for said resinous polymer. More particularly, this invention relates to expandable sealing tapes comprising a butyl rubber expandable resinous microspheres and a volatile liquid blowing agent contained in said microspheres.

As is well known, sealing compositions and caulking compositions have many uses. In most of these uses the sealant or caulking composition is inserted in the appropriate cavity. Unless a foamable composition is employed, the sealing or caulking composition must fill the whole cavity. However, the foamable compositions, which are usually based on urethanes are relatively expensive and give off toxic gases during curing. Accordingly, there is a need for low cost expandable sealant or caulking compositions.

One form of sealing compositions used in the automobile industry comprises a sealant tape comprising a rubber, plasticizer and/or filler which is typically extruded from an orifice onto siliconized paper. The resulting tape is rolled up for subsequent use. These sealant tapes are conveniently used as gasketing material. For example, the sealant tape can be applied to a window frame, the window inserted into the frame and the sealant cured. However, care must be exercised in such uses that a waterproof seal is formed between the window and window frame. A foamable sealant tape would have the advantage that there would be substantially greater tolerance possible in this operation and even if there are gaps between the sealant tape and either the window or window frame, the gap would be susceptible of filling by merely foaming the sealant tape to fill the void. Accordingly, there is a need for low cost expandable sealant tapes.

Although Georgea U.S. Pat. No. 4,005,033 discloses the incorporation of expanded microspheres into caulking compositions, this patent does not contemplate the use of a caulking composition containing unexpandable microspheres.

The general object of this invention is to provide a new class of low cost expandable sealant or caulking compositions. A more specific object of this invention is to provide a new class of low cost expandable sealant tapes. Other objects appear hereinafter.

I have now found that the objects of this invention can be attained by providing compositions comprising a butyl rubber standard caulking or sealing composition, preferably of the sealant tape type, containing expandable resilient resinous microspheres comprising a resinous polymer and a volatile liquid blowing agent inside said resinous microspheres. The compositions of this invention, preferably of the sealant tape type, can be inserted into an appropriate cavity and subsequently expanded by heating to an appropriate temperature to fill the cavity or void. Since relatively low cost caulking compositions can be employed as the principle vehicle for the microspheres, these compositions are relatively inexpensive particularly in contrast to the polyurethane foam compositions and do not provide the toxicity problems implicit in the use of polyurethanes.

Briefly, the compositions of this invention comprise resinous microspheres containing a volatile liquid blowing agent inside said resinous microspheres, a binder comprising a butyl rubber and, if desired, inorganic filler and fibrous material, such as asbestos.

Suitable resinous microspheres comprise heat expandable thermoplastic spheres having a diameter of about 0.001 to 10 millimeters containing a volatile blowing agent. The microspheres can have a wide variety of different polymer shell compositions, such as homopolymers and copolymers of ethylenically unsaturated monomers. Suitable monomers include monovinyl aromatics, such as styrene, vinyl toluene; vinyl halides, such as vinyl chloride, vinyl fluoride, vinyl bromide; vinylidiene halides such as vinylidiene chloride; alpha, beta-ethylenically unsaturated nitriles, such as acrylonitrile, methacrylonitrile; alpha, beta-ethylenically unsaturated carboxylic acid esters, such as methyl methacrylate, ethyl acrylate, dimethyl maleate; vinyl esters, such as vinyl acetate, vinyl propionate; etc.

Suitable volatile blowing agents include liquid or gaseous substances at room temperature that have a boiling point lower than the softening point of the polymer particles preferably lower than 100° C. and have the property of not dissolving the polymer particles. The preferred volatile blowing agents include hydrocarbons and halohydrocarbons such as propane, propylene, n-butane, isobutane, n-pentane, isopentane, n-hexane, dichlorofluoromethane, ethyl chloride, propyl chloride, etc. Upon heating, the liquid blowing agent converts to a gas causing the resinous microspheres to expand from 100 to several thousand percent in diameter.

The resinous microspheres can be used in a concentration of from about 5 to 25 percent by volume of the caulking composition of this invention. In view of their relatively low weight, it is relatively meaningless to consider the weight concentration of the microspheres in the final composition.

The binders useful in this invention include "polybutenes," "butyl rubber" and "polyisobutylene." As used in this specification the terms "polybutenes," "butyl rubber," and "polyisobutylene" are described below by their various physical characteristics, although all three substances generally can be described as isobutylene polymers. These compounds further are described in the Encyclopedia of Polymer Science and Technology, Vol. 2, John Wiley & Sons, 1965, pp. 754-795, and the references cited therein, are all incorporated by reference herein.

"Butyl rubbers" useful in this invention are solid, rubbery polymers of isobutylene containing about 1½ to 4½% isoprene. Generally, useful butyl rubbers have a Mooney viscosity ranging from about 40 to 65. A preferable butyl rubber contains about 1½ to 2% isoprene and has a Mooney viscosity of about 55. A too low viscosity butyl rubber will have little strength while a too high viscosity butyl rubber will be too tough such that the rubber will not disperse with the other components of this invention when mixed.

The preferred butyl rubber useful in this invention is a partially cross-linked butyl rubber in which about 25 to 75% of the potential cross-linking sites are actually cross-linked. An especially preferred butyl rubber is about 50% cross-linked. Unvulcanized butyl rubber is too tacky which results in handling problems in sealant compositions, while higher cross-linked butyl rubber has little tack which results in loss of sealant characteristics. A butyl rubber solution containing unvulcanized butyl rubber and mineral spirits is not preferable because of staining problems.

The polybutenes useful as a binder are a series of butylene polymers with viscosities ranging from about 200 to 1000 centipoises, preferably 625 to 675 centipoises, at 210° F. comprising predominantly (85-98%) of mono-olefins with the balance being isoparaffins. Typically, these polymers are made by polymerizing a butene feedstock, which is rich in isobutylene, with a metal halide catalyst. Mainly, the polymer backbone resembles polyisobutylene, but can contain 1- and 2-butenes, especially in lower molecular weight material. The mono-olefins comprising the main part of these polybutenes predominantly are dimethyl substituted terminal olefins with only minor amounts of vinylidene and terminal vinyl structures. Some internal double bonds probably exist, but are difficult to characterize. These polybutenes are chemically stable, permanently fluid liquids with moderate to high viscosity which are essentially water-white. These polymers are miscible at 20° C. with all hydrocarbon solvents, with chlorohydrocarbons such as carbontetrachloride, chloroform and trichloroethylene, with ethers such as diethylether and with esters such as n-butylacetate. They are insoluble at 20° C. with water, ethyl alcohol, isopropyl alcohol, acetone, methyl ethyl ketone and glacial acetic acid, but are partially soluble in n-butyl alcohol.

The "polyisobutylenes" useful in a binder of this invention typically are formed by depolymerizing butyl rubber. Typically, such polyisobutylenes are predominantly straight-chained, unbranched polymers of isobutylene having a viscosity average molecular weight ranging from about 20,000 to about 50,000, preferably about 35,000 to about 45,000. An especially preferable polyisobutylene useful in a binder in high quality sealants of this invention has a viscosity average molecular weight of about 35,000, unsaturation of about 4.2 mole % and a specific gravity of about 0.92.

The fillers useful in this invention are inorganic compounds with good oil absorbency characteristics and particle size distribution which permit a homogeneous product when mixed with the other components useful in this invention. Preferably, the filler has a low cost. Examples of suitable fillers include calcium carbonate, magnesium silicates, talc (especially platelet talc), diatomaceous silica, and clay. Calcium carbonate is the most preferable filler. Also preferable is a mixture of inorganic fillers such as calcium carbonate and diatomaceous silica, and calcium carbonate, diatomaceous silica, and clay (hydrous alumina silicate). Typically, suitable fillers should be particulate such that about 70% of the particles will pass through a 325 mesh screen. A filler formulation is chosen to have adequate oil retention while maintaining sufficient adhesion to substrates. Minor amounts of asbestos can be included within compositions of this invention.

Minor amounts up to about 7 wt. % of other substances may be incorporated within compositions of this invention including biocides, wetting agents such as soya fatty acid and oleic acid, colorants, and pigments such as titanium dioxide.

The sealing compositions and caulking compositions of this invention can be formulated by conventional means and subsequently extruded into sealing tapes by conventional means. These compositions can then be utilized in substantially the same method as compositions of prior art except that after the composition is utilized, a heat source can be applied to expand the microspheres. Typically the caulking composition is heated to a temperature of 75° to 200° C. to obtain the desired degree of expansion. The degree of expansion and concentration of microspheres can be determined by routine experimentation.

EXAMPLE 1

Fifteen and one tenth parts by weight Vistanex LMMS (polyisobutylene), 12.1 parts by weight Polysar Butyl 100 (copolymer rubber of isobutylene and isoprene), 0.8 parts by weight oleic acid, 20.1 parts by weight Indopol H-300 (liquid polybutene), 30.2 parts by weight talc and b 21.8 parts by weight asbestos 7 TF-1 were added to a Sigma blade mixer in the order listed and allowed to mix for approximately one hour. After the above formulation was compounded to form 95 percent, 90 percent and 80 percent by volume compositions with STYROPOR P 501 microspheres (polystyrene microspheres having an average diameter of 1.5 mm with a range of 0.06 to 3 mm and containing a volatile liquid blowing agent) by mixing in the Sigma blade mixer, they were extruded through a Hardman P. S. A. gun (manufactured by Hardman Triplematic Division, 67 Sandpark Road, Cedar Grove, N.J. at no more than 60° C. into sealant tapes. Each of the tapes were heated for fifteen minutes at 130° C. and the increase in volume of each tape is recorded below in Table I.

TABLE I

| % Microspheres | % Expansion in Volume |
| --- | --- |
| 0 | 0 |
| 5 | 30 |
| 10 | 75 |
| 20 | 100 |

After one month storage at room temperature, the unexpanded and expanded compositions were unchanged.

The above example illustrates that it is possible to produce expandable sealant tapes by incorporating microspheres containing a volatile liquid blowing agent into butyl rubber caulking composition.

We claim:

1. A process of caulking or sealing a cavity which comprises inserting into said cavity a composition comprising a butyl rubber containing about 1½ to 4½ percent isoprene and from about 5 to 25 percent by volume of expandable resinous microspheres containing a volatile blowing agent inside said resinous microspheres and heating said butyl rubber composition to expand same to fill the cavity.

2. The process of claim 1 wherein said butyl rubber composition is in the form of an expandable sealing tape.

3. The process of claim 1 wherein said butyl rubber has a Mooney viscosity ranging from about 40 to 65.

4. The process of claim 1 wherein said butyl rubber is a partially cross-linked butyl rubber in which about 25 to 75 percent of the potential cross-linking sites are cross-linked.

5. The process of claim 1 wherein said butyl rubber composition is expanded at a temperature of 75° to 200° C.

* * * * *